US008621375B2

(12) United States Patent
Berger et al.

(10) Patent No.: US 8,621,375 B2
(45) **Date of Patent: *Dec. 31, 2013**

(54) ASSOCIATING AN OBJECT WITH A RELEVANT DATA SOURCE

(75) Inventors: Peter Glen Berger, Irwin, PA (US); Peter William Rapp, Pittsburgh, PA (US); Michael Duncan Trent, Pittsburgh, PA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,438

(22) Filed: Jul. 15, 2011

(65) Prior Publication Data

US 2011/0271218 A1 Nov. 3, 2011

Related U.S. Application Data

(63) Continuation of application No. 11/890,783, filed on Aug. 6, 2007, now Pat. No. 8,006,194.

(51) Int. Cl.

*G06F 3/048* (2006.01)
*G06F 17/00* (2006.01)

(52) U.S. Cl.

USPC .......................................... 715/770; 715/215

(58) Field of Classification Search

USPC ................................................ 715/215, 770

See application file for complete search history.

(56) References Cited

U.S. PATENT DOCUMENTS

2004/0143788 A1* 7/2004 Aureglia et al. .............. 715/503
2007/0061752 A1* 3/2007 Cory ............................ 715/804

* cited by examiner

*Primary Examiner* — Nicholas Ulrich
(74) *Attorney, Agent, or Firm* — Womble Carlyle Sandridge & Rice, LLP

(57) ABSTRACT

Associating an object with a relevant data source is disclosed. In some embodiments, an object pasted into a destination document is associated with a data source included in the destination document. In various embodiments, the data source associated with the object may comprise a data source concurrently pasted with the object into the destination document, a data source already existing in the destination document prior to the object being pasted into the destination document, or a data source generated in the destination document using data extracted from the pasted object.

21 Claims, 10 Drawing Sheets

| | A | B |
|---|---|---|
| 1 | Red | 0.5 |
| 2 | Blue | 0.25 |
| 3 | Green | 0.25 |

| | A | B |
|---|---|---|
| 1 | Red | 0.5 |
| 2 | Blue | 0.25 |
| 3 | Green | 0.25 |

| | A | B |
|---|---|---|
| 1 | Red | 0.5 |
| 2 | Blue | 0.25 |
| 3 | Green | 0.25 |

| | A | B |
|---|---|---|
| 1 | Red | 0.25 |
| 2 | Blue | 0.75 |
| 3 | Green | 0 |

| | A | B |
|---|---|---|
| 1 | Red | 0.5 |
| 2 | Blue | 0.25 |
| 3 | Green | 0.25 |

| | A | B |
|---|---|---|
| 1 | Red | 0.25 |
| 2 | Blue | 0.75 |
| 3 | Green | 0 |

| | A | B |
|---|---|---|
| 1 | Red | 0.25 |
| 2 | Blue | 0.75 |
| 3 | Green | 0 |

| | A | B |
|---|---|---|
| 1 | Blue | 0.25 |
| 2 | Green | 0.25 |
| 3 | Red | 0.5 |

ASSOCIATING AN OBJECT WITH A RELEVANT DATA SOURCE

CROSS REFERENCE TO OTHER APPLICATIONS

This application is a continuation of co-pending U.S. patent application Ser. No. 11/890,783, entitled ASSOCIATING AN OBJECT WITH A RELEVANT DATA SOURCE filed Aug. 6, 2007 which is incorporated herein by reference for all purposes.

BACKGROUND OF THE INVENTION

In typical spreadsheet applications, a block of source data in a document may be employed to generate a chart (or graph) in the same document or in a different document. The chart may be cut or copied and pasted within the same document or to another document. The chart and any copies of the chart each includes a reference to the block of source data in an associated source data field. Dependencies between the block of source data and the chart and any copies of the chart are maintained. Such dependencies are used to ensure that the source data and the chart and any copies of the chart are synchronized. For example, if one or more values in the block of source data are modified, the chart and any copies of the chart are automatically updated. If the block of source data is moved to a different location within the same document or to a different document, e.g., using cut and paste operations, source data fields associated with the chart and any copies of the chart are automatically updated. Although a copy of the block of source data may be created and pasted within the same document or in a different document, the chart and any copies of the chart are bound to the block of source data and not to any of its copies. Changes to any copies of the block of source data do not affect the chart or any copies of the chart. Thus, in typical spreadsheet applications, a chart and any copies of the chart are bound to the block of source data from which the chart was originally created. If a different block of source data is desired to be associated with the chart or a copy of the chart, the source data field of the chart or copy of the chart has to be manually modified.

BRIEF DESCRIPTION OF THE DRAWINGS

Various embodiments of the invention are disclosed in the following detailed description and the accompanying drawings.

DETAILED DESCRIPTION

Figure 1A:
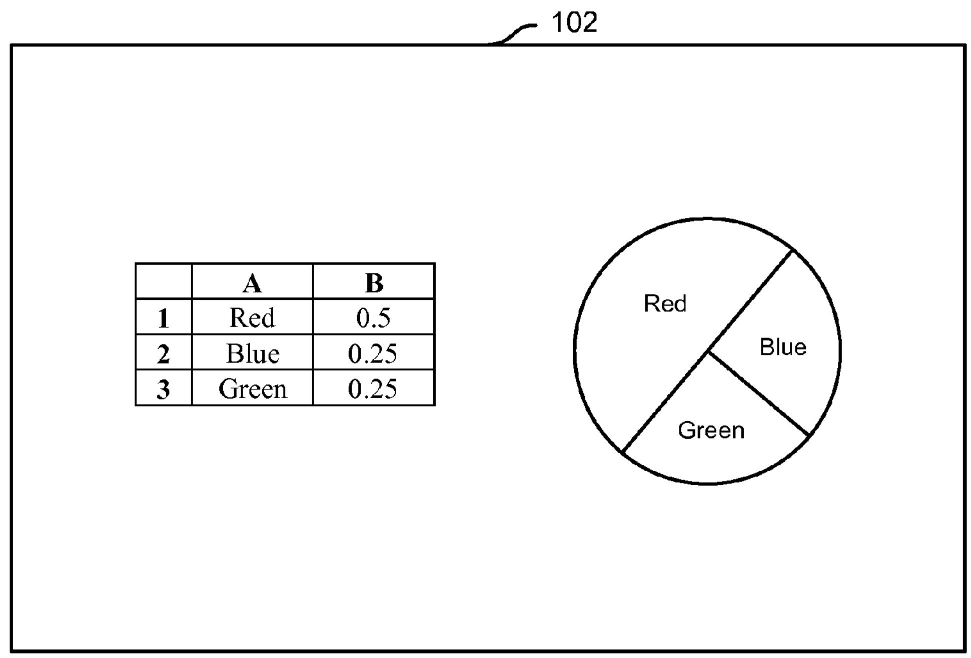
FIG. 1A illustrates the starting states of two documents.
Figure 1A:
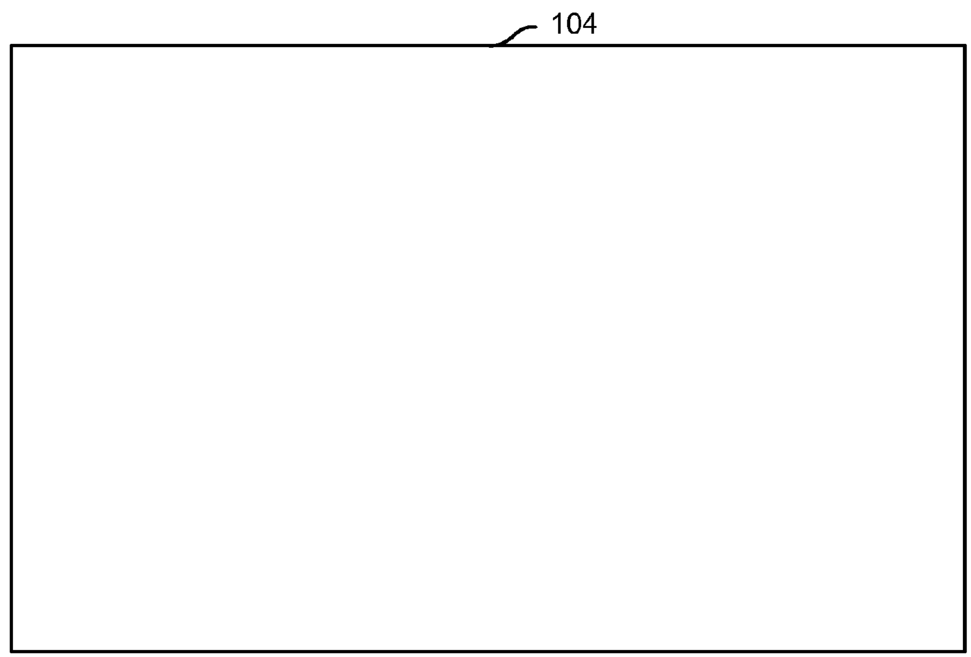

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Associating an object with a relevant data source is disclosed. In some embodiments, an object pasted into a destination document is associated with a data source also included in the destination document. In some embodiments, the data source with which an object is associated is concurrently pasted with the object into the destination document. In some embodiments, in the cases in which the object is pasted into the destination document without concurrently pasting an associated data source, the object is associated with an existing data source in the destination document that has a data source identifier that is the same as the data source identifier associated with the object if such a data source exists in the destination document. In some embodiments, in the cases in which the object is pasted into the destination document without concurrently pasting an associated data source and in which the destination document does not already include a data source that has a data source identifier that is the same as the data source identifier associated with the object, a new data source with a new data source identifier is generated for the object being pasted in the destination document and is populated with data extracted from the object.

Although the examples provided herein are with respect to a particular spreadsheet application, the techniques described herein may be employed with respect to any application, spreadsheet or otherwise, in which it would be useful to associate an object with a relevant data source. The workspace of the spreadsheet application described in the examples herein comprises an infinite or seemingly infinite canvas on which one or more finite objects, such as tables, text, charts, graphs, shapes, images, photographs, graphics, animations, multimedia content, etc., may be placed. The techniques disclosed herein are not limited to use in a spreadsheet or other application having such a workspace. Depending on its type, an object may have at least standard spreadsheet functionality associated with it. For example, a table object is comprised of a desired number of rows and columns of cells which are associated with at least standard spreadsheet functionality associated with cells. The term "at least standard spreadsheet functionality" in the context of cells of a table includes the ability to define the content of one cell in such a way that the content of the one cell is determined based at least in part on the content of one or more other cells, and the content of the one cell is updated automatically without further human action if the content of one or more of the one or more other cells is changed. With respect to a chart (or graph), for example, the term "at least standard spreadsheet functionality" includes the ability to define a chart based at least in part on the content of one or more cells and to update the chart automatically and without further human action if the content of one or more of the one or more cells is changed. In such cases, the table that includes the one or more cells comprises the data source of the chart. In some embodiments, a chart is associated with multiple data sources, e.g., tables. Although in many of the provided examples associating a chart with a relevant source table is described, the techniques disclosed herein can be similarly employed with respect to any appropriate type of object having any appropriate data sources. In some embodiments, a data source is associated with a data source identifier, which may, e.g., be included in a data source reference associated with an object that at least in part depends on source data included in the data source. Such a data source identifier of a data source uniquely identifies the data source within at least a relevant space, e.g., such as across one or more documents and/or applications. In some embodiments, all instances or copies of a data source are associated with the same unique data source identifier, which may be globally unique across one or more applications.

In some embodiments, each table within a document is associated with an identifier. In some embodiments, a table and copies of the table are associated with the same unique identifier. In some embodiments, the unique identifier of a table and its copies is globally unique across documents of one or more application(s). In some embodiments, a chart generated from source data included in one or more cells of a table includes, e.g., with respect to a reference to the source data, the table identifier of the source table. A chart is synchronized with source data included in its associated source table, i.e. the table having the table identifier included in the source data reference of the chart. A chart included in a first document may be cut or copied and pasted into a second document of the same application, a different application, or a different application within a related suite of applications. In some embodiments, a table that includes the source data of a chart is included in each document in which the chart or a copy of the chart is included. In some such cases, a chart is synchronized with source data included in an associated table in the same document. For example, when a chart and its associated table are copied from a first document and pasted into a second document, the chart in the second document is synchronized with source data included in its associated table in the second document rather than the same table (i.e. the table having the same table identifier) in the first document. If only a chart is cut or copied from a first document and pasted into a second document and a table having the table identifier associated with the chart does not already exist in the second document, in some embodiments, a new source table is automatically generated in the second document that is populated with source data extracted from the chart. In such cases, a new table identifier is associated with the source table generated in the second document, and the table identifier included in the source data reference in the chart is updated to be the new table identifier. As further described, when a chart is desired to be pasted into a destination document, in some embodiments, it is dynamically determined whether or not to create a new data source (e.g., table) based on whether an associated data source concurrently exists on an associated paste board and/or already exists in the destination document.

Figure 1B:
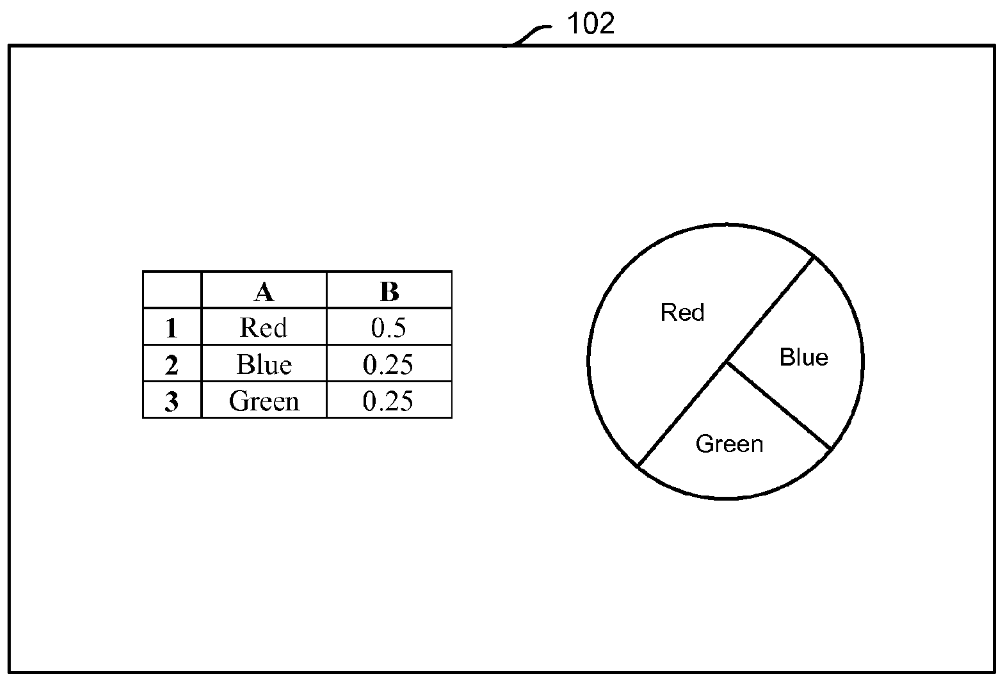
FIG. 1B illustrates copying and pasting a table and a chart.
Figure 1B:
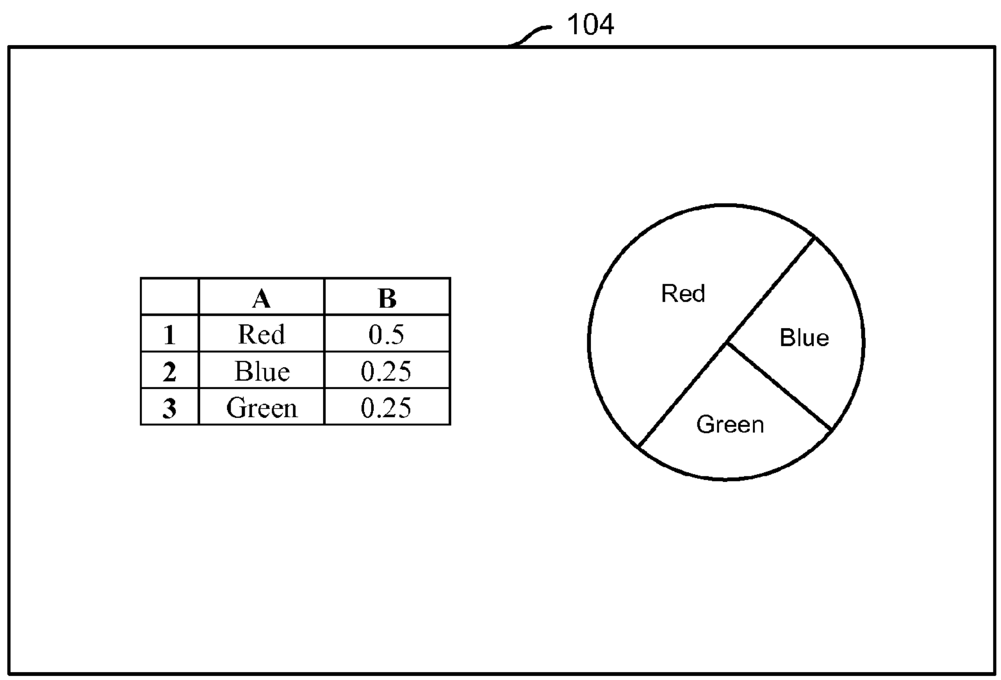
Figure 1C:
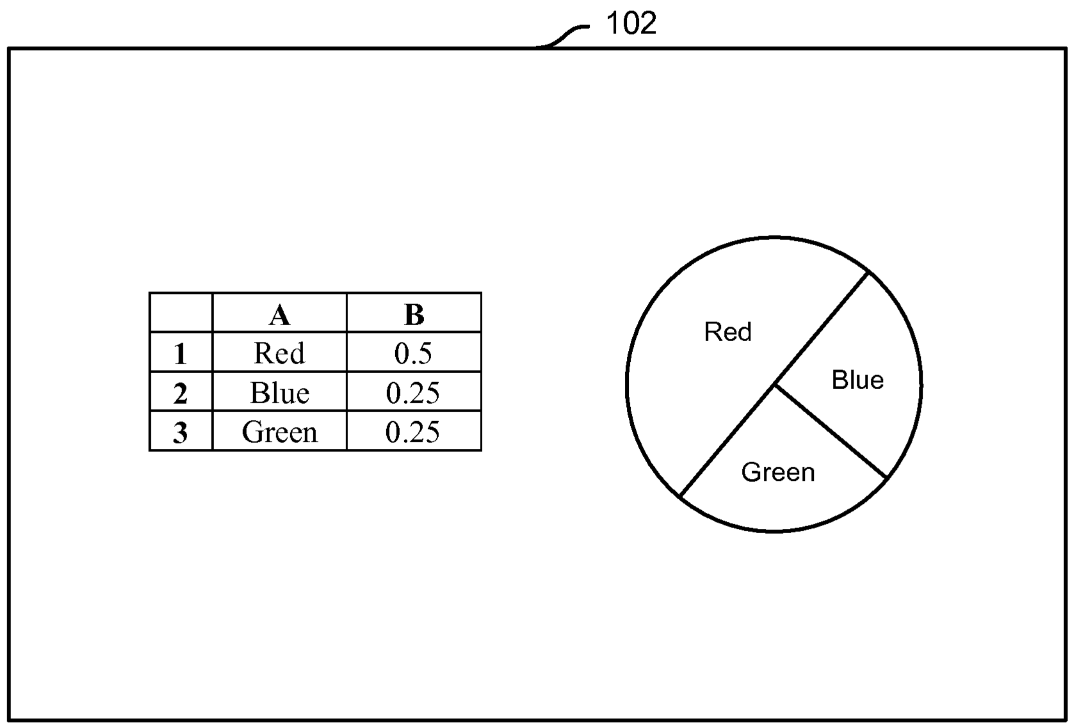
FIG. 1C illustrates deleting a chart.
Figure 1C:
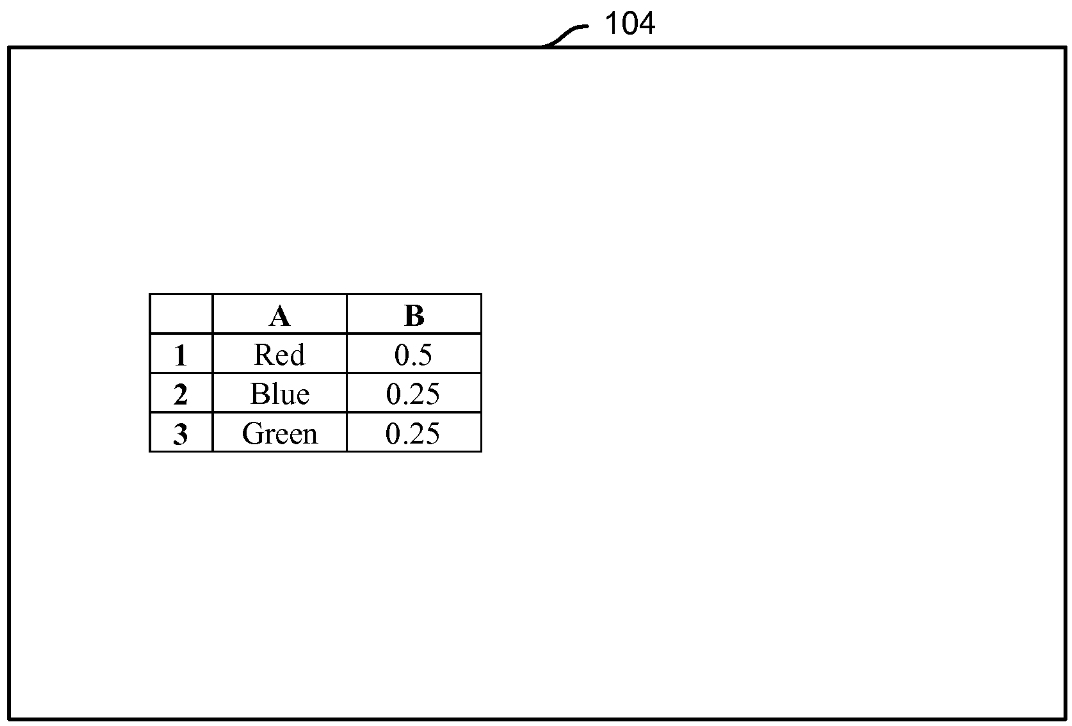
Figure 1D:
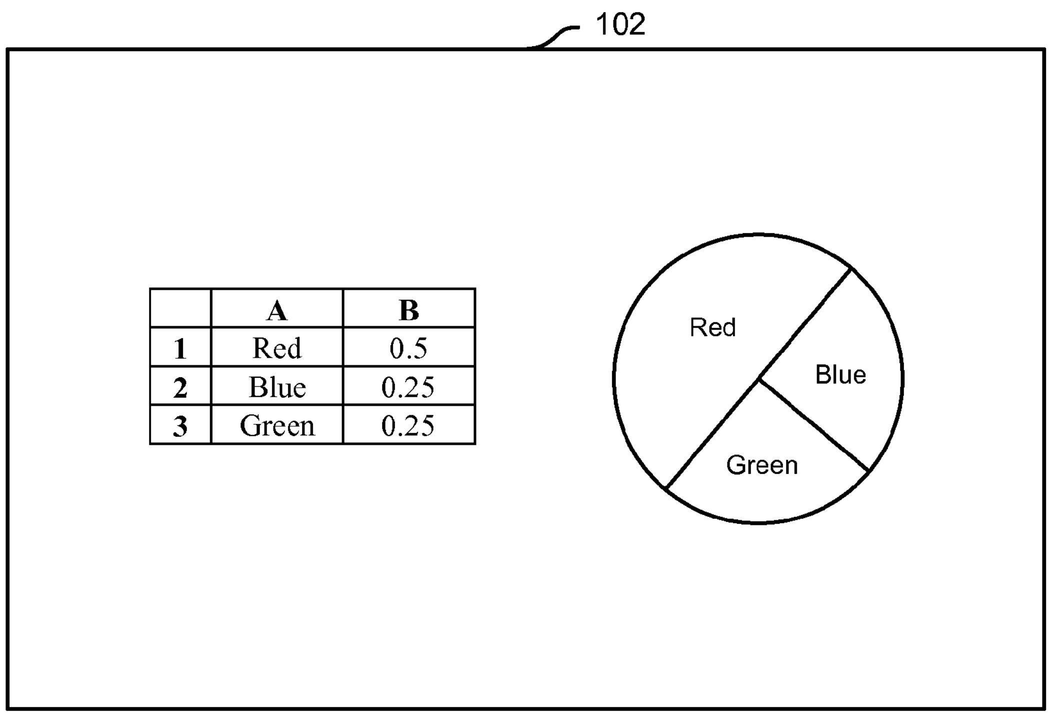
FIG. 1D illustrates changing the values of a table.
Figure 1D:
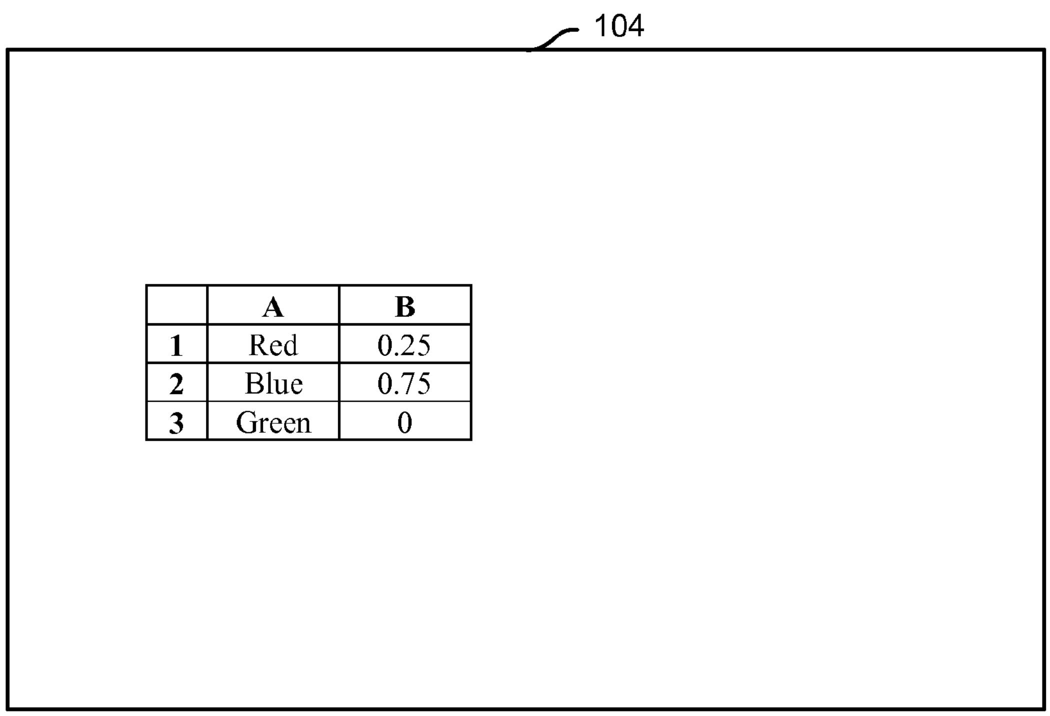
Figure 1E:
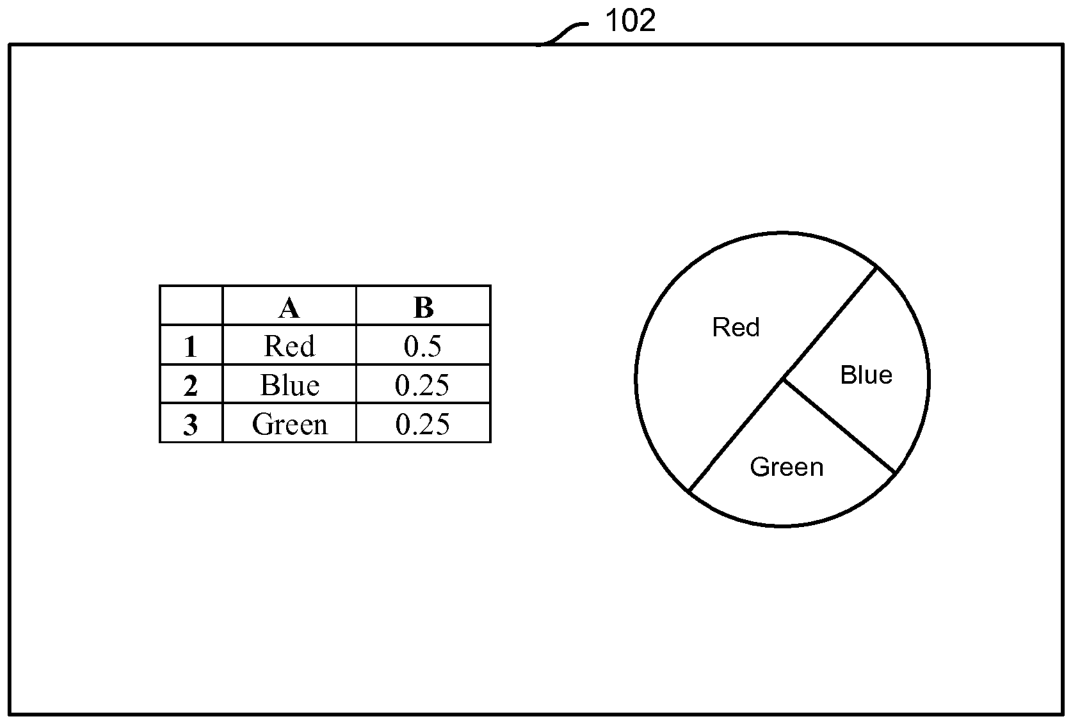
FIG. 1E illustrates copying and pasting a chart.
Figure 1E:
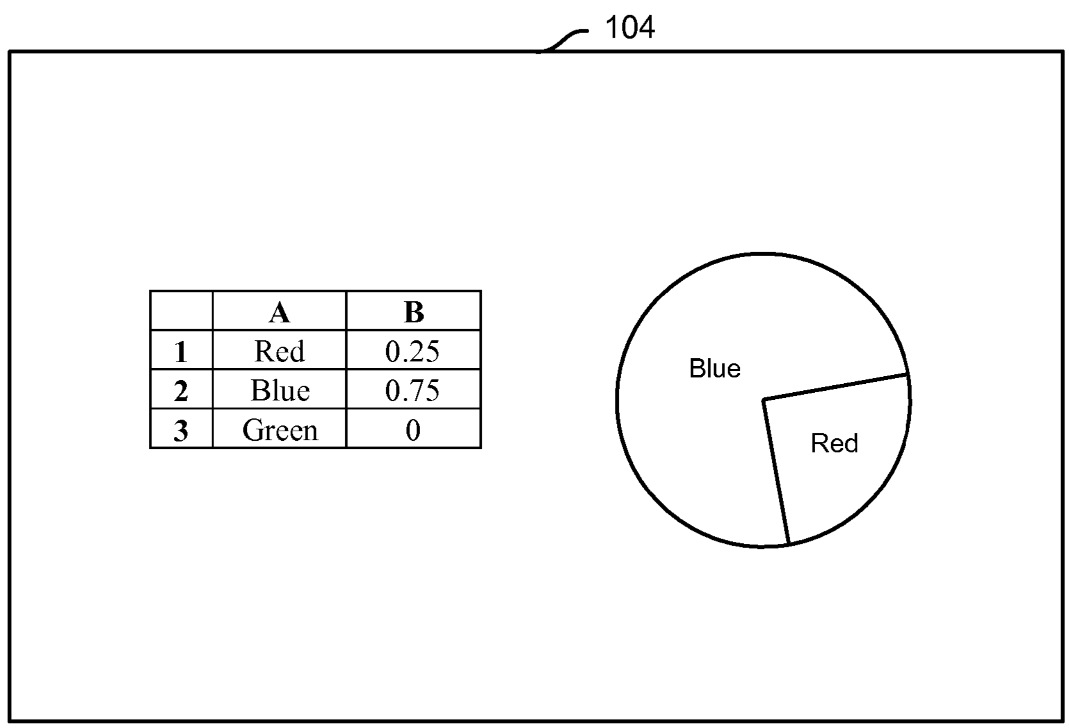

FIGS. 1A-1E illustrate embodiments of associating a chart with a relevant source table and an embodiment of a sequence of consecutive states of two documents 102 and 104. FIG. 1A illustrates the starting states of documents 102 and 104. As depicted, document 102 includes a table and a chart generated from data included in the table, and document 104 is blank. FIG. 1B illustrates the result of copying the table and chart of document 102 and pasting them into document 104. FIG. 1C illustrates deleting the chart copied into document 104. FIG. 1D illustrates changing the values in the table of document 104, e.g., after the chart has been deleted. FIG. 1E illustrates the result of copying only the chart from document 102 and pasting it into document 104. As depicted in FIG. 1E, the chart pasted in document 104 is automatically synchronized to source data included in its associated table in document 104 and not to the table included in document 102. Although in the given example the chart of document 102 is copied and pasted into document 104 in FIG. 1B and subsequently deleted in FIG. 1C, the behavior illustrated in FIG. 1E would be identical if only the table of document 102 is copied and pasted into document 104 in FIG. 1B and the chart is pasted into document 104 for the first time in FIG. 1E. That is, the chart would be synchronized to source data included in an associated table in the same document.

As at least in part described with respect to FIGS. 1A-1E, if a source table of a chart is not concurrently being pasted with a chart being pasted in a destination document, the chart is synchronized with source data included in a table in the destination document that has a table identifier that is the same as that included in the source data reference of the chart if such a table exists in the destination document. In some embodiments, if a table is pasted into a destination document that already includes a table having the table identifier of the table that is being pasted, the pasted table overwrites the existing table. For example, consider the state of FIG. 1E. In a next consecutive state, if the table of document 102 is subsequently copied and pasted into document 104, the pasted table overwrites the existing table, and the chart of document 104 is appropriately synchronized with source data included in the pasted table. However, relative to the state of FIG. 1E, if the chart of document 102 is copied and pasted into document 104, the pasted chart does not overwrite the existing chart since multiple charts may be created from the same source data. In such a case, the pasted chart, like the existing chart of document 104, would be synchronized to source data included in the table of document 104.

Figure 2A:
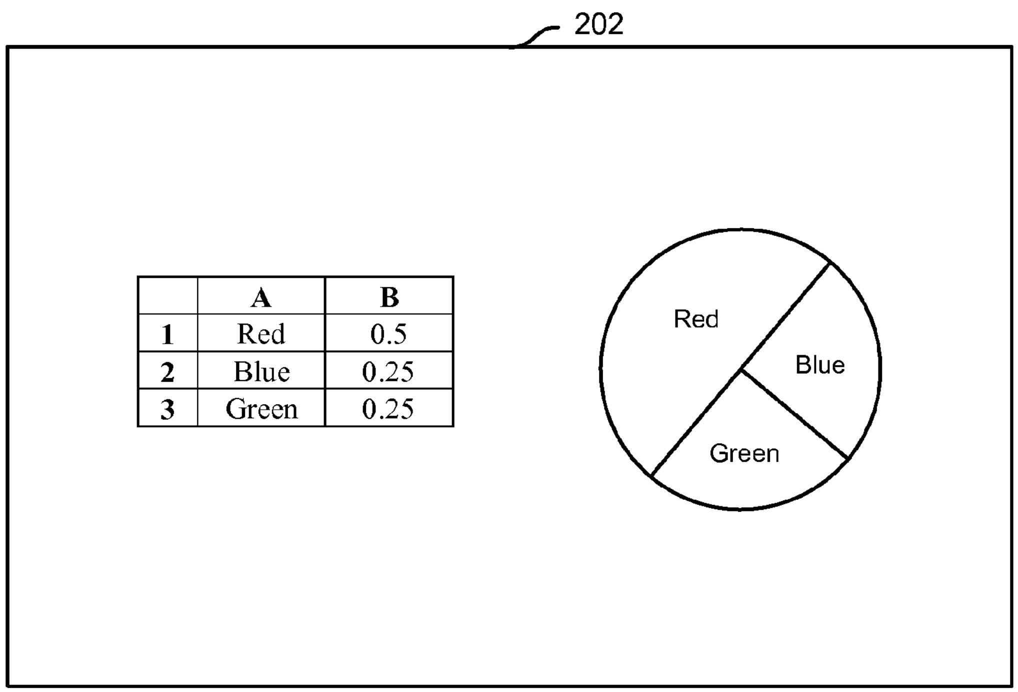
FIG. 2A illustrates the starting states of two documents.
Figure 2A:
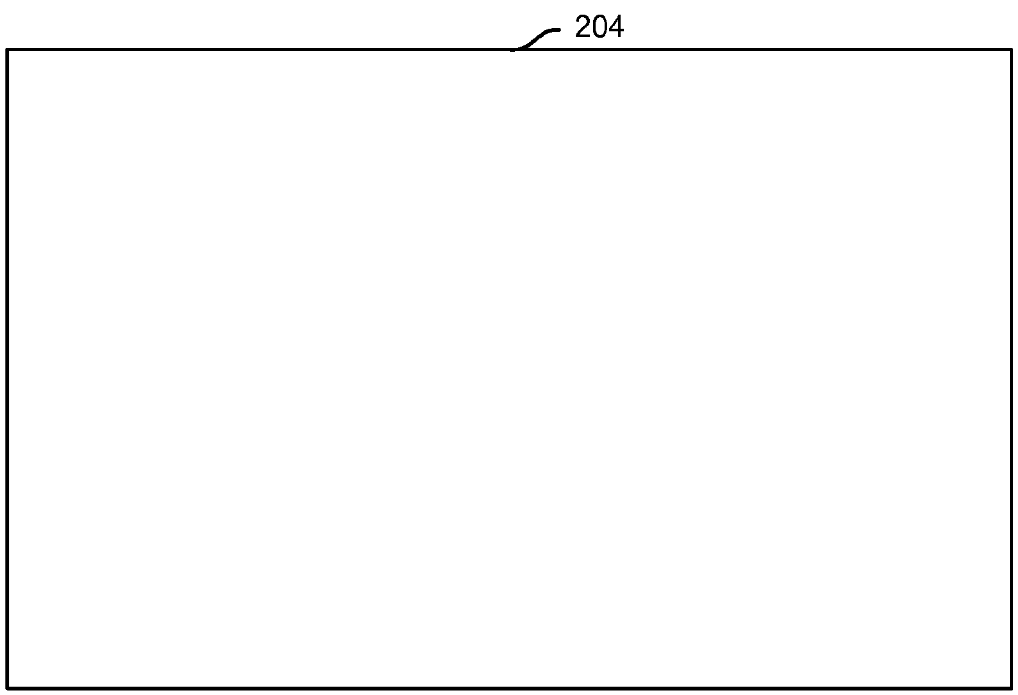
Figure 2B:
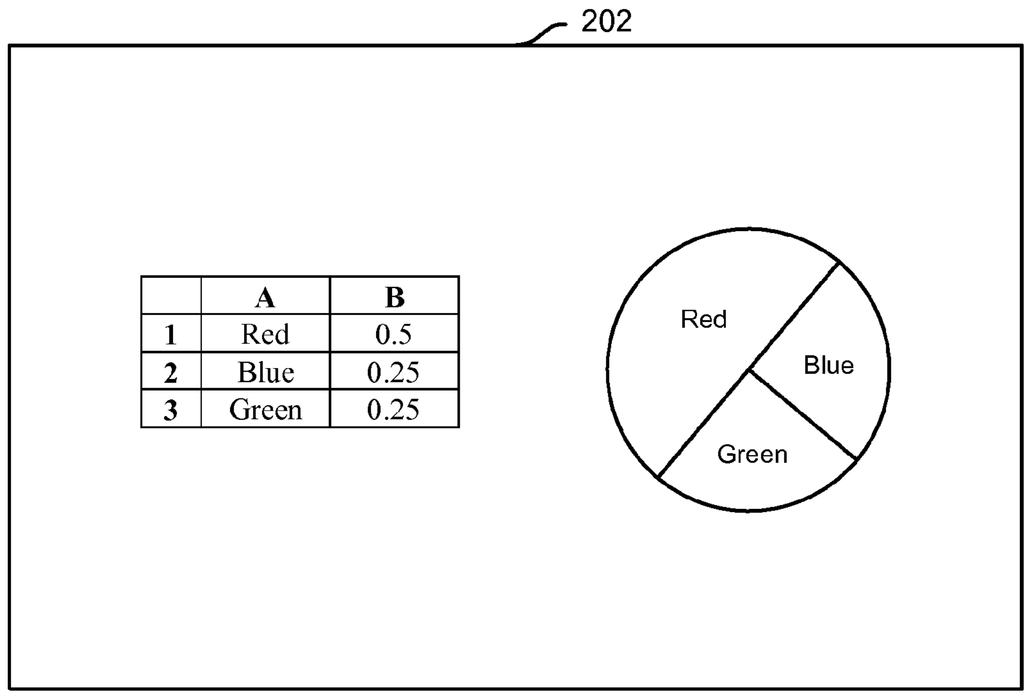
FIG. 2B illustrates copying and pasting a chart.
Figure 2B:
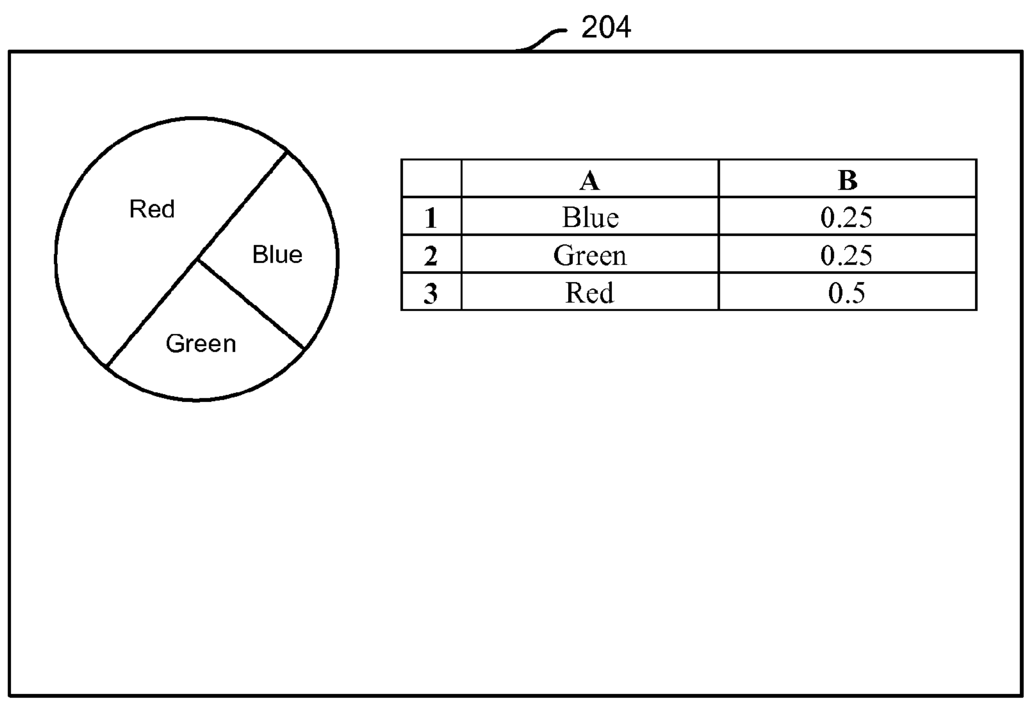
Figure 2C:
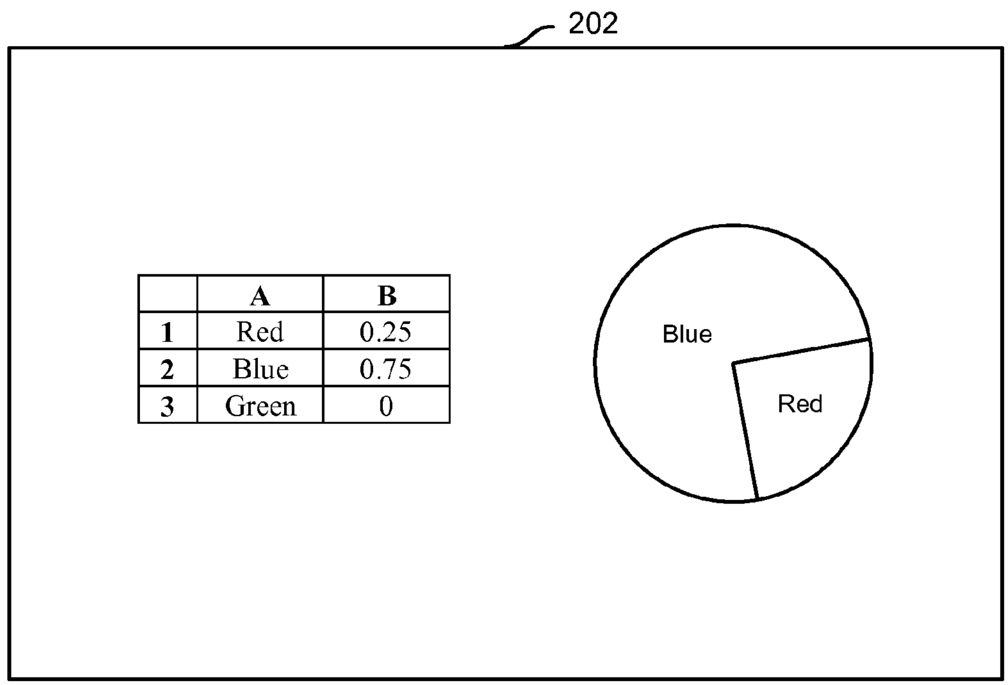
FIG. 2C illustrates changing the values of a table.
Figure 2C:
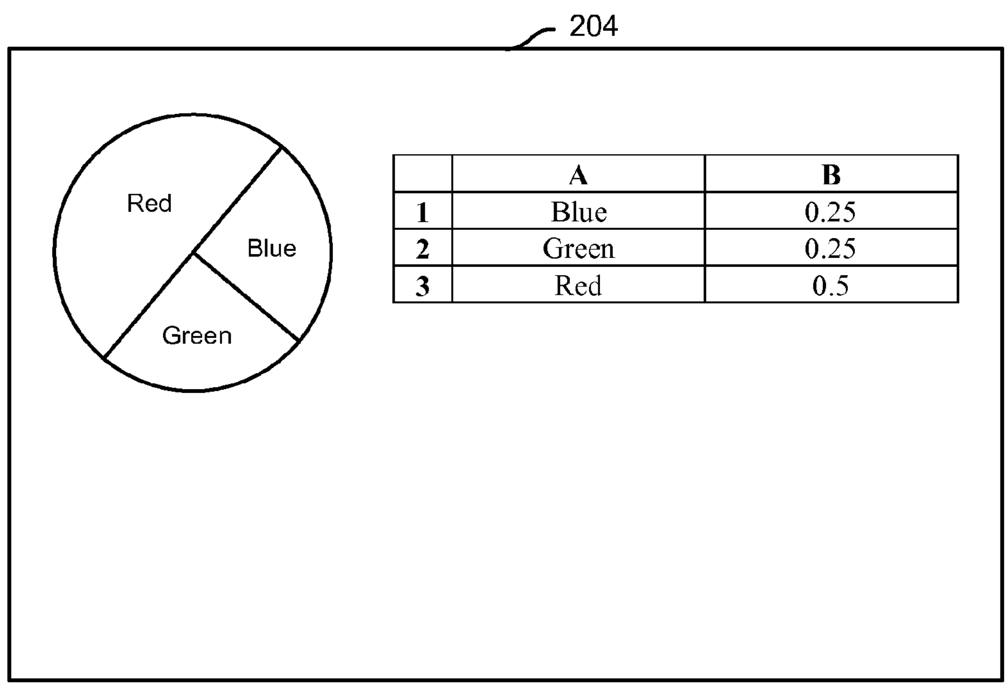

FIGS. 2A-2D illustrate embodiments of associating a chart with a relevant source table and an embodiment of a sequence of consecutive states of two documents 202 and 204. FIG. 2A illustrates the starting states of documents 202 and 204. As depicted, document 202 includes a table and a chart generated from data included in the table, and document 204 is blank. FIG. 2B illustrates the result of copying only the chart of document 202 and pasting it into document 204. As depicted, a table is automatically generated in document 204 and populated with data extracted from the chart being pasted into document 204 when the chart is pasted into document 204. The table identifier included, e.g., in a source data reference, in the chart of document 204 is updated from the table identifier associated with the table of document 202 to a new table identifier associated with the table generated in document 204. Although the table of document 204 includes the same data as the table of document 202, it may have a different layout and/or style than the table of document 202 as depicted in FIG. 2B since it is automatically generated. For example, it may have a default layout and/or style that is different than a custom layout and/or style of the table of document 202. FIG.

Figure 2D:
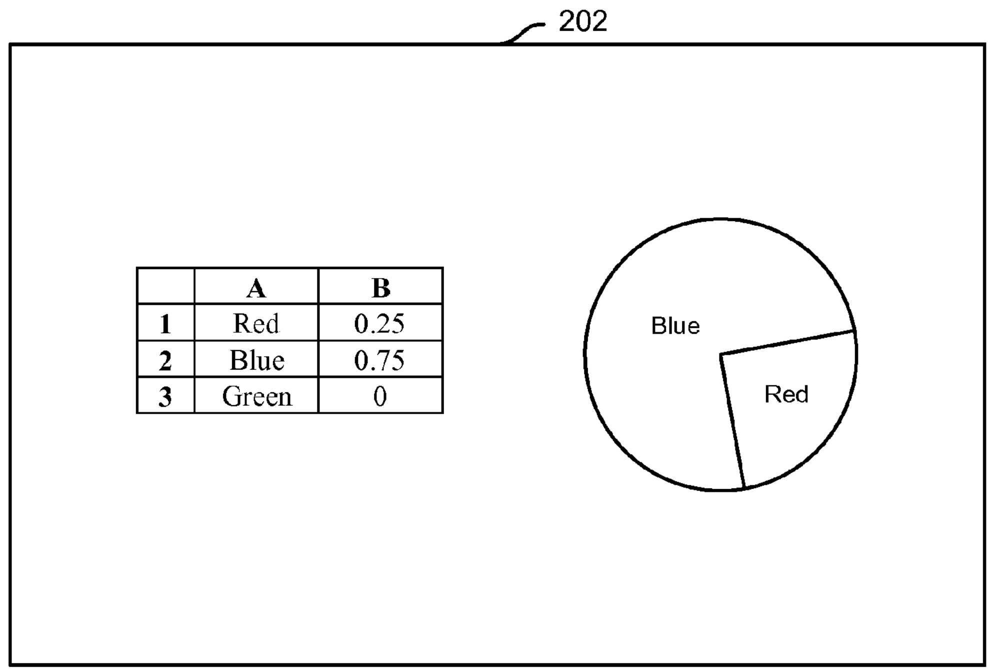
FIG. 2D illustrates copying and pasting a table.
Figure 2D:
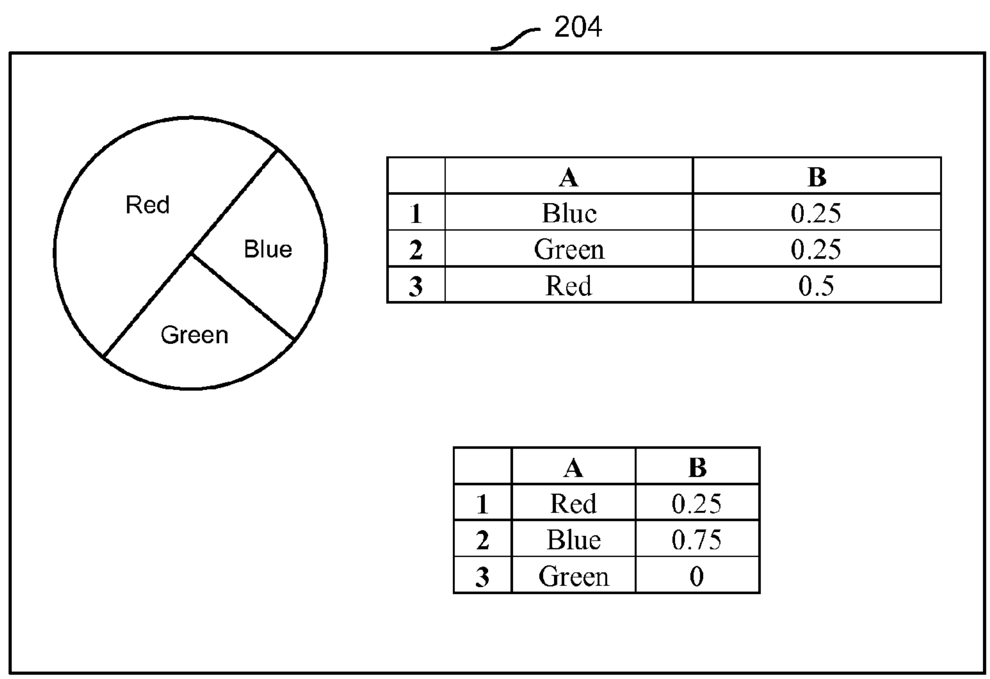

2C illustrates changing the values in the table of document 202 and the consequent automatic updating or synchronization of the chart of document 202. As depicted, the chart in document 204 is not affected by the change in values in the table of document 202. FIG. 2D illustrates the result of copying the table of document 202 and pasting it into document 204. As depicted, the chart of document 204 is not affected by the data values of the copied table since it is linked to the table generated in FIG. 2B.

Figure 3:
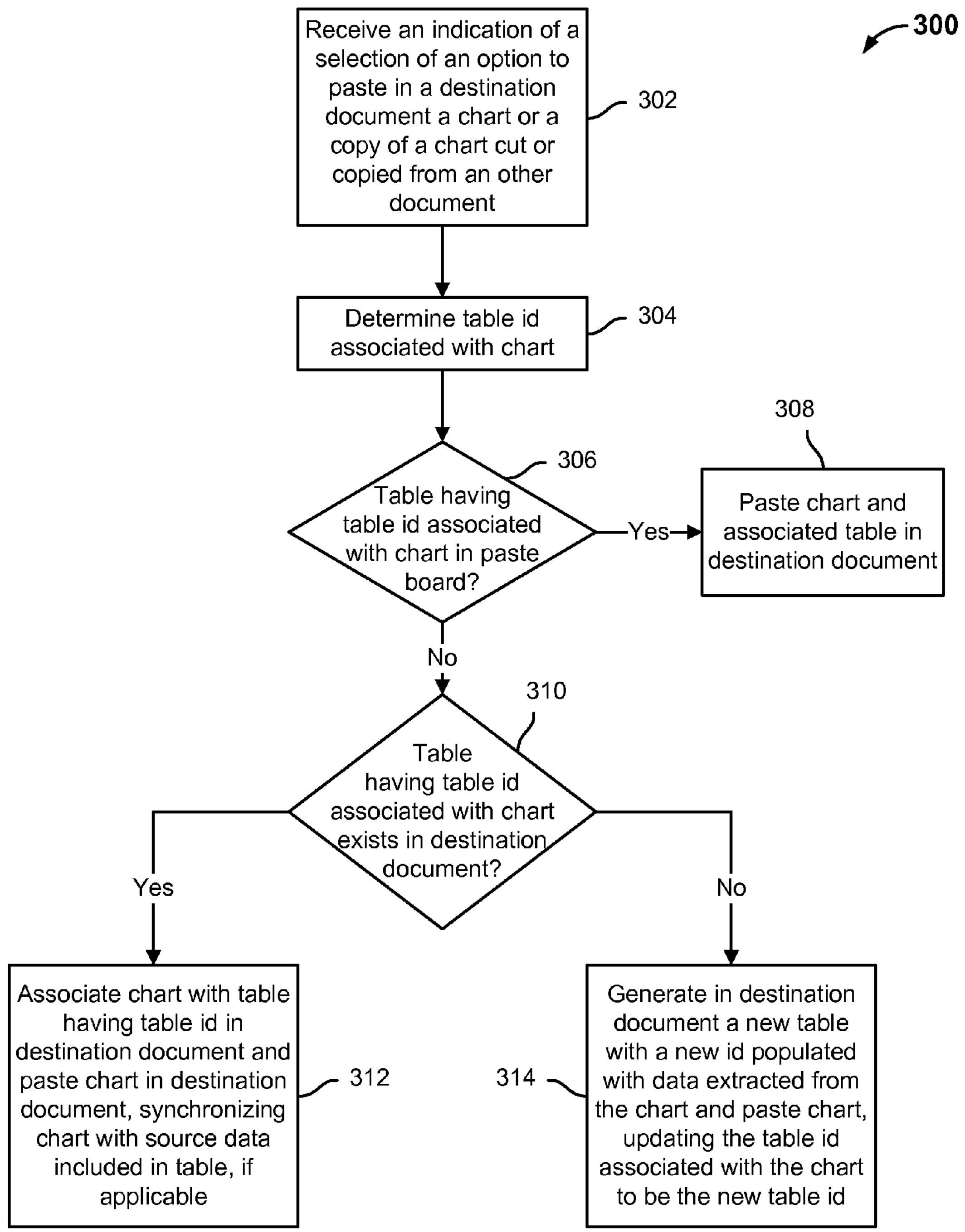
FIG. 3 illustrates an embodiment of a process for associating a pasted chart with a relevant source table.

FIG. 3 illustrates an embodiment of a process for associating a pasted chart with a relevant source table. In some embodiments, process 300 is employed with respect to FIGS. 1A-1E and FIGS. 2A-2D. Process 300 starts at 302 at which an indication of a selection of an option to paste in a destination document a chart or a copy of a chart cut or copied from an other document is received. At 304, the table identifier associated with the chart is determined. In some embodiments, the table identifier associated with the chart is included with a reference of source data associated with the chart, e.g., in a source data field associated with the chart. At 306 it is determined whether a table having the table identifier associated with the chart is included in a current paste board. If it is determined at 306 that a table having the table identifier associated with the chart is included in a current paste board, the chart and its associated table are pasted from the paste board into the destination document at 308. In some embodiments, 308 comprises pasting the contents of the current paste board, e.g., the chart and its associated table. In some embodiments, 308 includes overwriting existing versions of the table and/or chart when pasting in the destination document. If it is determined at 306 that a table having the table identifier associated with the chart is not included in a current paste board, it is determined at 310 whether a table having the table identifier associated with the chart already exists in the destination document. If it is determined at 310 that a table having the table identifier associated with the chart already exists in the destination document, the chart is associated with the table and pasted in the destination document at 312. In some embodiments, 312 includes synchronizing the chart with source data included in its associated table as applicable. If it is determined at 310 that a table having the table identifier associated with the chart does not exist in the destination document, at 314 a new table having a new table identifier is generated in the destination document and populated with data extracted from the chart, and the chart is pasted. The table identifier associated with the chart is updated to be the new table identifier at 314 so that the chart is associated with the new table.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

receiving, by a processor, an indication to paste an object into a destination document, the object being cut or copied from a source document different from the destination document;

determining a source data reference associated with the object, the source data reference corresponding to a data source from which the object is generated;

identifying a data source identifier corresponding to a destination data source in the destination document; and in response to determining that the data source identifier corresponds to the source data reference, associating the object with the destination data source and synchronizing data in the object with data in the destination data source.

2. The method of claim 1, wherein determining that the data source identifier corresponds to the source data reference includes determining that the data source identifier matches the source data reference.

3. The method of claim 1, further comprising:

pasting the object in the destination document, wherein pasting the object comprises pasting contents of a current paste board in the destination document.

4. The method of claim 1, wherein the object is not synchronized with data included in one or more data source instances included in one or more other documents, each of which has a data source identifier that is the same as the source data reference associated with the object and the data source identifier associated with the data source.

5. The method of claim 1, wherein the destination document comprises a document of a spreadsheet application.

6. The method of claim 1, wherein the object comprises a chart or a graph.

7. The method of claim 1, wherein the data source comprises a table.

8. A method comprising:

receiving, by a processor, an indication to paste an object into a destination document, the object being cut or copied from a source document different from the destination document and being placed in a paste board;

determining a source data reference associated with the object, the source data reference corresponding to a data source from which the object is generated;

determining whether a data source is in the paste board when the indication to paste the object into the destination document is received;

in response to determining that the data source is in the paste board, determining whether a data source identifier corresponding to the data source matches the source data reference associated with the object;

in response to determining that the data source identifier matches the source data reference, associating the object with the data source and synchronizing data in the object with data in the data source.

9. The method of claim 8, further comprising:

pasting the object in the destination document, wherein pasting the object comprises pasting contents of the paste board in the destination document.

10. The method of claim 8, wherein the object is not synchronized with data included in one or more data source instances included in one or more other documents, each of which has a data source identifier that is the same as the source data reference associated with the object and the data source identifier associated with the data source.

11. The method of claim 8, wherein the object is not synchronized with data included in one or more data source instances included in one or more other documents.

12. The method of claim 8, wherein the destination document comprises a document of a spreadsheet application.

13. The method of claim 8, wherein the object comprises a chart or a graph.

14. The method of claim 8, wherein the data source comprises a table.

15. A method comprising:

receiving, by a processor, an indication to paste an object into a destination document, the object being cut or copied from a source document different from the destination document;

determining a source data reference associated with the object, the source data reference corresponding to a data source from which the object is generated;

determining whether a destination data source exists in the destination document, the destination data source having a data source identifier that corresponds to the source data reference; and in response to determining that the destination data source exists in the destination document, associating the object with the destination data source and synchronizing data in the object with data in the destination data source.

16. The method of claim 15, further comprising:

in response to determining that the destination data source does not exist in the destination document, generating a new data source with a new identifier in the destination document, the new data source being populated with data extracted from the object; and updating the source data reference associated with the object to be the new identifier.

17. The method of claim 16, further comprising:

associating the object with the destination data source and synchronizing data in the object with data in the destination data source.

18. The method of claim 15, further comprising:

pasting the object in the destination document, wherein pasting the object comprises pasting contents of a current paste board in the destination document.

19. The method of claim 15, wherein the object is not synchronized with data included in one or more data source instances included in one or more other documents, each of which has a data source identifier that is the same as the source data reference associated with the object and the data source identifier associated with the data source.

20. The method of claim 15, wherein the destination document comprises a document of a spreadsheet application.

21. The method of claim 15, wherein the object comprises a chart or a graph and the data source comprises a table.

* * * * *